(12) United States Patent
Gruenberger et al.

(10) Patent No.: US 8,492,945 B2
(45) Date of Patent: Jul. 23, 2013

(54) STARTER-GENERATOR

(75) Inventors: Joachim Gruenberger, Sachsenheim (DE); Leo Spiegel, Vaihingen/Enz (DE); Stephan Mueller, Leonberg (DE)

(73) Assignee: Dr. Ing. H.C. F. Porsche Aktiengesellschaft (DE)

( * ) Notice: Subject to any disclaimer, the term of this patent is extended or adjusted under 35 U.S.C. 154(b) by 243 days.

(21) Appl. No.: 12/915,628

(22) Filed: Oct. 29, 2010

(65) Prior Publication Data
US 2011/0115225 A1 May 19, 2011

(30) Foreign Application Priority Data
Nov. 19, 2009 (DE) .......................... 10 2009 053 948

(51) Int. Cl.
*H02K 49/00* (2006.01)

(52) U.S. Cl.
USPC .......................................... 310/92; 310/75 R

(58) Field of Classification Search
USPC ................... 310/92, 75 R, 46; 290/46
See application file for complete search history.

(56) References Cited

U.S. PATENT DOCUMENTS

| | | | | |
|---|---|---|---|---|
| 5,927,452 A * | 7/1999 | Freise et al. | ................ | 192/3.52 |
| 6,302,253 B1 * | 10/2001 | Link et al. | ................ | 192/55.61 |
| 6,437,467 B1 * | 8/2002 | Schierling et al. | .............. | 310/51 |
| 6,455,959 B1 | 9/2002 | Demont et al. | | |
| 6,484,596 B2 | 11/2002 | Puchas | | |
| 6,528,918 B2 | 3/2003 | Paulus-Neues et al. | | |
| 6,586,852 B2 * | 7/2003 | Geiger et al. | .................. | 310/51 |
| 7,472,768 B2 * | 1/2009 | Denner et al. | .............. | 180/65.1 |
| 2001/0043019 A1 * | 11/2001 | Heyden et al. | .................. | 310/74 |

FOREIGN PATENT DOCUMENTS

| | | |
|---|---|---|
| DE | 199 60 366 | 2/2001 |
| DE | 199 43 037 | 3/2001 |
| DE | 199 43 048 | 3/2001 |
| DE | 199 43 050 | 3/2001 |
| DE | 102 21 562 | 11/2003 |
| DE | 102 58 654 | 7/2004 |
| DE | 100 00 253 | 4/2008 |
| JP | 2001145315 | 5/2001 |

* cited by examiner

*Primary Examiner* — Nguyen N Hanh
(74) *Attorney, Agent, or Firm* — Gerald E. Hespos; Michael J. Porco; Matthew T. Hespos

(57) ABSTRACT

A starter-generator is provided for a motor vehicle that has a drive train (1) with a drive machine (4), a torque-transmission device (8) and a transmission. The starter-generator (20) has an external rotor (22) and a stator (21). To simplify the manufacture of the motor vehicle, the starter-generator has a rotor flange (28) connected in a rotationally fixed fashion to an input component (16) of the torque-transmission device (8) and extends from the rotor (22).

8 Claims, 2 Drawing Sheets

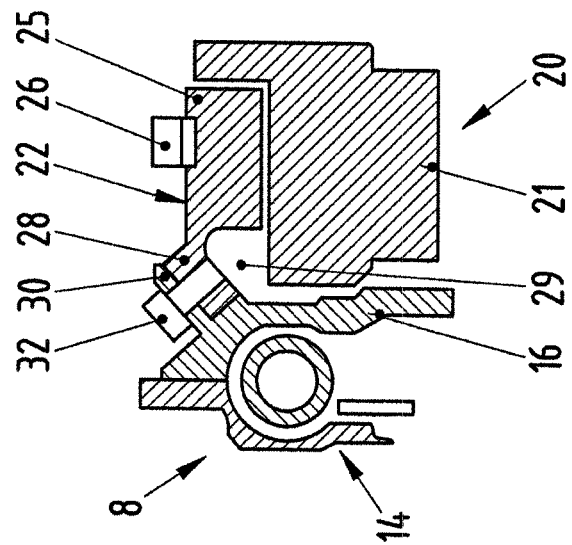
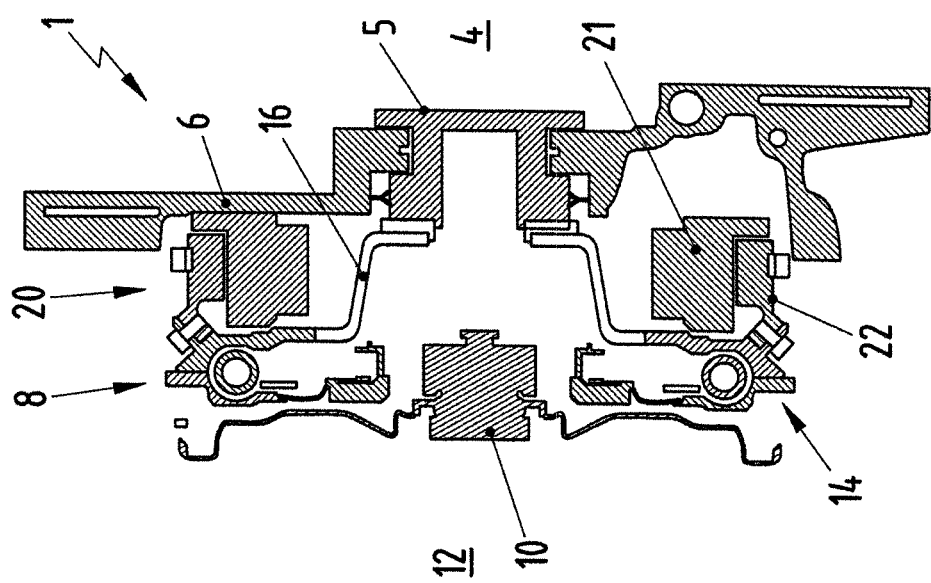
Fig. 2
Fig. 1

STARTER-GENERATOR

CROSS-REFERENCE TO RELATED APPLICATION

This application claims priority under 35 USC 119 to German Patent Application No. 10 2009 053 948.4 filed on Nov. 19, 2009, the entire disclosure of which is incorporated herein by reference.

BACKGROUND OF THE INVENTION

1. Field of the Invention

The invention relates to a starter-generator for a motor vehicle that has a drive train with a drive machine, a torque-transmission device and a transmission. The invention also relates to such a motor vehicle with a starter-generator and to a method for mounting the starter-generator in the motor vehicle.

2. Description of the Related Art

U.S. Pat. No. 6,455,959 discloses a starter-generator that defines a permanently excited external rotor synchronous machine that has a stator connected to the engine block and a rotor connected to a flywheel. Similar starter-generators are known from DE 102 58 654 B4 and DE 199 60 366 C1.

An object of the invention is to simplify the manufacture of a motor vehicle that has a drive train with a drive machine, a torque-transmission device and a transmission, and particularly to simplify mounting of a starter-generator.

SUMMARY OF THE INVENTION

The invention relates to a starter-generator for a motor vehicle having a drive train with a drive machine, a torque-transmission device and a transmission. The starter-generator has a stator and a rotor. A rotor flange extends from the rotor and is connected in a rotationally fixed fashion to an input component of the torque-transmission device. The stator is mounted permanently on a motor housing component, and preferably on a crank housing component. The rotor is mounted on the input component of the torque-transmission device independently of the stator. The rotor flange considerably simplifies the mounting of the rotor on the input component of the torque-transmission device. The invention permits standardization of the starter-generator, which preferably is a crankshaft starter-generator.

The rotor flange preferably is connected integrally to the rotor. The rotor flange preferably is at an angle to a rotor base body, which is essentially in the form of a circular ring with a rectangular ring cross section.

The rotor flange preferably is arranged at an acute angle to a rotational axis of the rotor, and most preferably at an angle of 45 degrees to the rotational axis of the rotor.

The starter-generator preferably is a standard component that can be installed in different motor vehicles. The inventive configuration of the rotor with the rotor flange allows the same starter-generator to be installed as a standard component in different motor vehicles. The torque-transmission device can comprise a clutch and/or a hydrodynamic torque converter.

The torque-transmission device preferably has a rotary oscillation damper with an input component connected in a rotationally fixed fashion to the drive machine and to which the rotor is attached with the rotor flange. The rotary oscillation damper preferably is connected upstream of a clutch and/or a hydrodynamic torque converter.

The rotor with the rotor flange is attached to a connecting component that permits a rotationally fixed, but otherwise partially flexible, connection to the input component of the torque-transmission device. The connecting component preferably is a sheet-metal component that also is referred to as flex blade.

The invention also relates to a motor vehicle having a drive train that has a drive machine, a torque-transmission device, a transmission and the above-described starter-generator. The rotor and the stator of the starter-generator preferably are assigned to different mounting units. In this context, the stator is assigned, for example, to a first mounting unit that comprises the drive machine. The rotor is assigned, for example, to a second mounting unit that comprises the torque-transmission device.

The invention also relates to a method for mounting starter-generator as described above in a motor vehicle. The method is characterized in that the two mounting units are mounted successively in the motor vehicle, with the rotor and the stator being combined. The rotor and the stator have no common housing and are not connected jointly to the crankshaft of the drive machine.

Further advantages, features and details of the invention emerge from the following description with reference to the drawings.

BRIEF DESCRIPTION OF THE DRAWINGS

FIG. 1 is a longitudinal cross-section of a detail of a drive train of a motor vehicle with a starter-generator according to a first embodiment.

FIG. 2 shows an enlarged detail from FIG. 1.

DETAILED DESCRIPTION OF THE PREFERRED EMBODIMENTS

Figure 4:
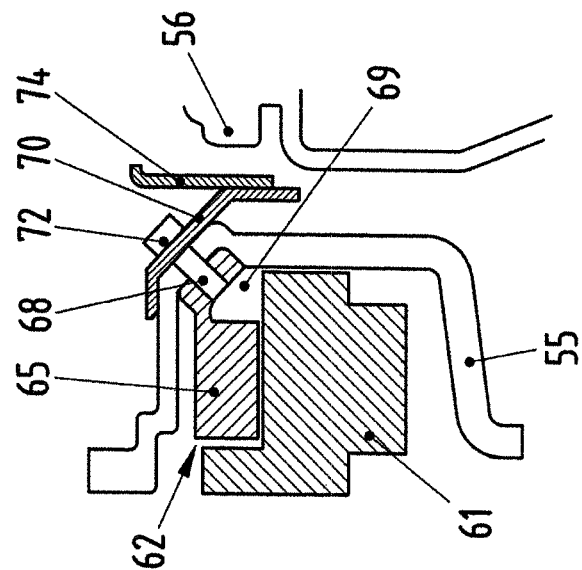
FIG. 4 shows an enlarged detail from FIG. 3.

A drive train in accordance with the invention is illustrated in a highly simplified manner in FIGS. 1 to 4. The drive train is identified generally by the numeral 1 in FIG. 1 and by the numeral 41 in FIG. 3. The drive train 1 of FIG. 1 has a drive machine 4 and a crank shaft 5 extending from said drive machine 4. The crankshaft 5 is mounted rotatably in a crank casing 6. Similarly, the drive train 41 of FIG. 3 has a drive machine 44 and a crankshaft 45 extending from the drive machine 44. The crankshaft 45 is mounted rotatably in a crank casing 46.

The crankshaft 5 of the drive machine 4 in FIG. 1 can be connected in terms of drive to a transmission input shaft 10 of a transmission 12 via a torque-transmission device 8. Similarly, the crankshaft 45 of the drive machine 44 in FIG. 3 can be connected in terms of drive to a transmission input shaft of a transmission 52 via a torque-transmission device 48. The torque-transmission devices 8; 48 can comprise at least one clutch, at least one hydrodynamic torque converter and/or at least one rotary oscillation damper.

In the embodiment of FIGS. 1 and 2, the torque-transmission device 8 has a rotary oscillation damper 14 with an input component 16 connected in a rotationally fixed fashion to the crankshaft 5 of the drive machine 4.

A starter-generator 20 with a stator 21 and a rotor 22 is arranged between the rotary oscillation damper 14 and the crank casing 6. The starter-generator 20 is an external rotor device with the rotor 22 arranged in a rotatable fashion radially outside the stator 21. The stator 21 of the starter-generator 20 is attached to the crank casing 6.

The rotor 22 has a rotor base body 25 that essentially is in the form of a circular ring with a rectangular cross section, as shown in FIG. 2. A starter toothed ring 26 is attached radially to the outside of the rotor base body 25.

A rotor flange 28 extends from the rotor base body 25 and is arranged at an angle of 45 degrees to a rotational axis of the rotor 22. This arrangement of the rotor flange 28 defines a free space 29 bounded by the rotor base body 25, the rotor flange 28 and the stator 21. The free space 29 provides an air space that facilitates the propagation of electrical field lines during operation of the starter-generator 20.

An attachment flange 30 is attached to the rotor flange 28 and is at an angle to the input component 16 of the rotary oscillation damper 14. The attachment flange 30 has substantially the same shape as the rotor flange 28 and is attached thereto using attachment elements 32, such as screws. The attachment flange 30 preferably is at an angle of approximately 90 degrees to the input component 16 and can be connected integrally thereto.

Figure 3:
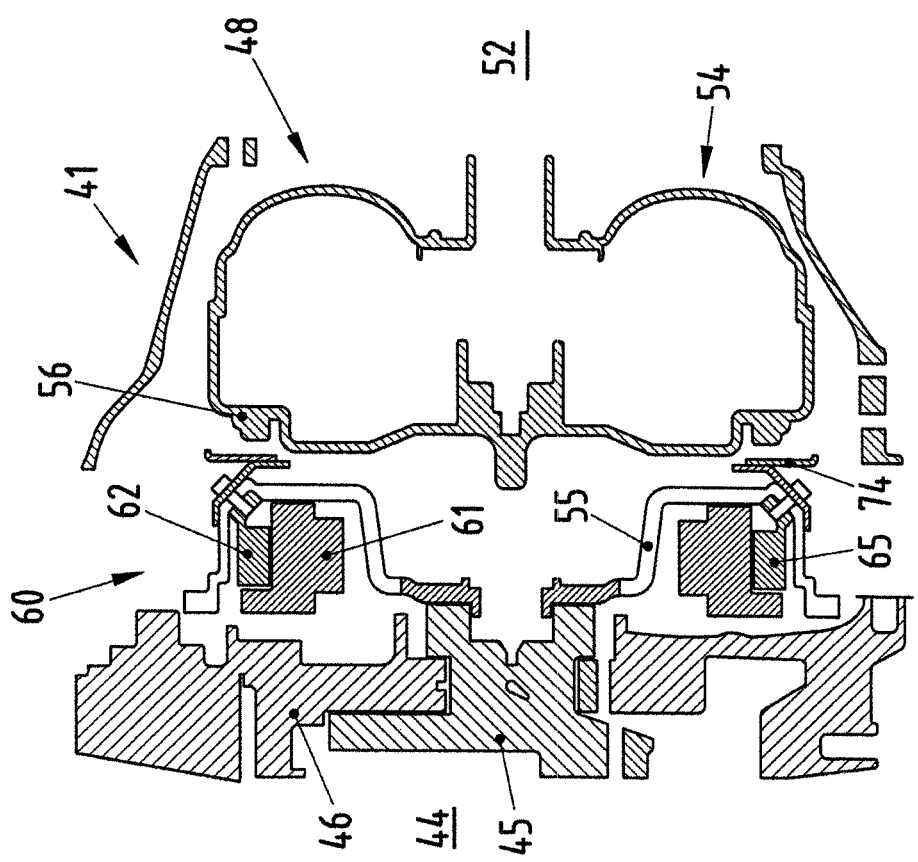
FIG. 3 shows a second embodiment with the same starter-generator as FIG. 1.

In the embodiment of FIGS. 3 and 4, the torque-transmission device 48 has a hydrodynamic torque converter 54, which is illustrated in highly simplified form. An input component 55 of the torque-transmission device 48 is connected in a rotationally fixed fashion to the crankshaft 45. An input component 56 of the hydrodynamic torque converter 54 is connected in a rotationally fixed fashion to the input component 55.

A starter-generator 60 with a stator 61 and a rotor 62 is arranged between the torque converter 54 and the crank casing 46. The rotor 62 comprises a rotor base body 65 and a rotor flange 68 arranged at an angle to the rotor base body 65. In contrast to the preceding exemplary embodiment, there is no starter toothed ring attached to the rotor base body 65. In other respects, the rotor 62 is similar to the rotor 22.

The rotors 22 and 62 have the same dimensions, but are installed rotated through 180 degrees in the two embodiments because the drive machine 4 in the embodiment of FIG. 1 is arranged on the right, while the drive machine 44 in the embodiment of FIG. 3 is arranged on the left. The arrangement of the drive machines 4; 44 results, inter alia, from whether the respective drive machine is arranged in the front region or in the rear region of the associated motor vehicle.

As in the preceding embodiment, the bent rotor flange 68 results in a free space 69 that improves the propagation of an electrical field during operation of the starter-generator 60.

The rotor flange 68 is attached to the input component 55 of the torque-transmission device 48 in such a way that a section of the input component 55 is clamped between an attachment flange 70 and the rotor flange 68 using an attachment element 72, such as a screw. A connecting component 74 in turn is attached to the attachment flange 70 and preferably defines a flexible sheet-metal component connected in a rotationally fixed fashion (not illustrated) to the input component 56 of the hydrodynamic torque converter 54.

The starter-generator 20; 60 starts the drive machine 4; 44, which preferably is an internal combustion engine. On the other hand, the starter-generator 20; 60 generates current when the drive machine 4; 44 is running.

The starter-generator 20; 60 can be used in various internal combustion engines and with various transmissions. In this context, the starter-generator 20; 60 does not have to be changed or configured differently for different applications.

The adaptation to the respective installation situation can be carried out by adapting the torque-transmission device 8; 48, in particular the rotary oscillation damper 14, which preferably is a two-mass flywheel, or the connecting component 74.

What is claimed is:

1. A starter-generator for a motor vehicle having a drive train that has a drive machine, a torque-transmission device and a transmission, the starter-generator having an external rotor that is rotatable about a rotational axis and a stator, the rotor having a rotor base body and a rotor flange extending integrally from the rotor base body and being aligned at an acute angle to the rotational axis, the rotor flange being connected in a rotationally fixed fashion to an attachment element of the input component of the torque-transmission device, the attachment element also being aligned at the acute angle to the rotational axis.

2. The starter-generator of claim 1, wherein the rotor flange is arranged at an angle of approximately 45 degrees to the rotational axis of the rotor.

3. The starter-generator of claim 1, wherein the starter-generator is a standard component that can be installed in different motor vehicles.

4. The starter-generator of claim 1, wherein the torque-transmission device comprises a rotary oscillation damper, the input component of the torque-transmission device being part of the rotary oscillation damper and being connected in a rotationally fixed fashion to the drive machine, the rotor flange of the rotor being attached to the input component.

5. The starter-generator of claim 1, wherein the rotor flange of the rotor is attached to a connecting component that permits a rotationally fixed, but otherwise partially flexible, connection to the input component of the torque-transmission device.

6. A motor vehicle having a drive train that comprises a drive machine, a torque-transmission device, a transmission and a starter-generator, the starter-generator having a stator and an external rotor that is rotatable relative to the stator about a rotational axis, the rotor having a rotor base body and a rotor flange extending integrally from the rotor base body and being aligned at an acute angle to the rotational axis, the rotor flange being connected in a rotationally fixed fashion to an attachment element of an input component of the torque-transmission device, the attachment element also being aligned at the acute angle to the rotational axis and being configured to position the rotor base body outward of the stator.

7. The motor vehicle of claim 6, wherein the rotor and the stator are attached to two different mounting units.

8. A method for mounting a starter-generator in a motor vehicle, comprising;
    providing a stator and an external rotor that is rotatable about a rotational axis, the external rotor having a rotor base body configured for mounting around the stator and a rotor flange extending integrally from the rotor base body and being aligned at an acute angle to the rotational axis;
    mounting the stator to a first mounting unit;
    mounting the rotor flange to a second mounting unit having an attachment flange disposed and aligned for nesting with the rotor flange; and
    successively mounting the first and second mounting units in the motor vehicle so that the rotor base body substantially surrounds the stator.

* * * * *